United States Patent [19]

Schwartz et al.

[11] Patent Number: 4,535,368

[45] Date of Patent: Aug. 13, 1985

[54] WOW AND FLUTTER CONTROL APPARATUS FOR AUDIO AND VIDEO PLAYBACK SYSTEMS

[76] Inventors: Jack Schwartz; Tai T. Wu, both of 147 Ridge St., Arlington, Mass. 02174

[21] Appl. No.: 499,981

[22] Filed: Jun. 1, 1983

[51] Int. Cl.³ .............................................. G11B 5/02
[52] U.S. Cl. ........................................ 360/28; 360/27
[58] Field of Search ............................. 360/26, 27, 28

[56] References Cited

U.S. PATENT DOCUMENTS

| 3,897,379 | 7/1975 | Defrancesco et al. | 360/27 |
| 4,353,099 | 10/1982 | Shum et al. | 360/28 |
| 4,425,589 | 1/1984 | Camras | 360/27 |

Primary Examiner—Vincent P. Canney

[57] ABSTRACT

Apparatus for correcting the distortion in the output of a playback device introduced by wow and flutter by sampling a constant frequency as reproduced and comparing it with the signal as originally recorded to produce a correction signal for modulating a delay device coupled to the output of the playback device.

9 Claims, 5 Drawing Figures

WOW AND FLUTTER CONTROL APPARATUS FOR AUDIO AND VIDEO PLAYBACK SYSTEMS

BACKGROUND OF THE INVENTION

1. Field of the Invention

The present invention relates generally to the field of audio/video systems and more particularly to apparatus for correcting the output of playback systems to reduce or eliminate the effects of wow and flutter.

2. Description of the Prior Art

Commonly known audio and video disc and tape playback devices exhibit frequency modulation effects, which to a greater or lesser degree, depending upon the quality of the device, distort the output. One type of distortion is in the form of instantaneous frequency deviations introduced by speed fluctuations in the recording and playback processes and is referred to as wow for lower frequency deviation rates and flutter for higher deviation rates.

Another form of frequency modulation distortion is observed in the transmission of short wave radio signals. Such signals are reflected from an atmospheric layer which is constantly changing in altitude about an average altitude. This phenomenon produces a variation in the radio frequency pathlength and thus a doppler shift in the frequency at the receiver. While technically not wow and flutter the character of the distortion is essentially the same.

Prior to the present invention measures taken to minimize wow and flutter have included the use of high inertia drive mechanisms in tape and disc players. Quality playback devices also employ mechanical servomechanisms, however, when provided with sufficient gain to be effective, they tend to become unstable and oscillate thus defeating their purpose. Alternatively, synchronous drive motors are used which, on average lock to the power line frequency but may have short term fluctuations above and below that frequency. Typically these measures are not adequately effective for instantaneous frequency deviations in excess of about 2 Hz. Moreover, mechanical eccentricities in rotating mechanisms can cause frequency modulations that are not controllable through application of a servo to the driving motor.

OBJECTS AND SUMMARY OF THE INVENTION

From the preceding discussion it will be understood that among the various objectives of the present invention are included the following:

the provision of new and improved apparatus for correction of wow and flutter in audio and video playback devices;

the provision of apparatus of the above-described character which is effective to correct distortion due to deviation of instantaneous frequencies at rates in excess of 2 Hz/Sec; and the provision of apparatus of the above-described character which employs no moving parts.

These and other objectives of the present invention are efficiently achieved by sampling a constant frequency on the recording at the output of the playback device and comparing the sample as reproduced with a signal representing that frequency as originally recorded in a frequency correction computer. The frequency correction computer output operates to control the clock rate of a shift register delay device which in turn modifies the output signal of the playback device to correct the instantaneous frequency deviations between samplings of the signal as reproduced. In a digital embodiment the shift register delay device is replaced by a random access memory.

DESCRIPTION OF PREFERRED EMBODIMENT

For operation of the present invention it is necessary that the original sound or video recording include a channel on which a constant frequency signal is recorded. This channel need not occupy a physically distinct area on the tape or disc and may be in either the ultrasonic or subsonic frequency range and is in addition to the normal recorded program material. The signal would have to be specifically introduced during the recording of phonograph records or video discs, however, the principles of the invention do apply to recording media. Modern tape recording/playback systems are by their nature more readily adapted for use of the applicants' invention since the signal to be recorded is used to modulate a relatively high frequency bias signal already present in the recording head, and used to demagnetize the tape before recording a signal to thereby improve the signal-to-noise ratio of the recording. The bias signal for a given type of recording tape is a known constant frequency which is readily adaptable for use as an input to the present invention in addition to its use for signal-to-noise purposes.

Figure 1:
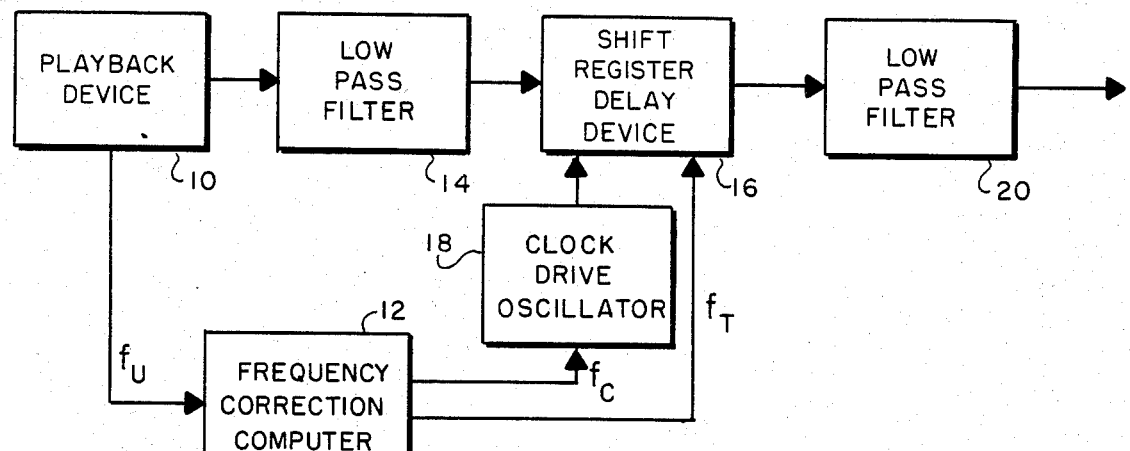
FIG. 1 is a block diagram of the system of the present invention.

Turning now to FIG. 1 there is shown a playback device 10 such as a phonograph or video disc player or an audio or video tape recorder in the playback mode. The term playback device is also deemed to include a short wave radio receiver. The constant frequency, $f_U$, as reproduced by the playback device 10 is coupled to a frequency correction computer 12 which will be described in detail hereinbelow. The output channel(s) of the playback device are coupled to a first low pass filter 14 having a cut-off frequency less than one-half of the maximum clock drive rate of the frequency correction computer 12. The output of the low pass filter 14 is coupled to a shift register type of delay device 16 which introduces a delay proportional to the instantaneous clock rate at time of input to the delay device of a clock drive oscillator 18. The frequency correction computer 12 analyzes the constant frequency as reproduced, $f_U$, with respect to its known value, $f_T$ and based upon the deviation of the reproduced from the target value generates a correction signal, $f_C$, which is used to modulate the clock rate of clock drive oscillator 18. The output of the shift register delay device 16 is the playback device 10 output corrected to substantially eliminate the effects of wow and flutter. That output is coupled to a second low pass filter 20 having a cutoff frequency matched to that of the first filter 14.

The characteristics of the low pass filters 14 and 20 are related to the minimum and maximum clock rates of the clock drive oscillator 18. To avoid the introduction of a form of distortion known as aliasing when a continuous signal is replaced by a sequence of sampled values the low pass filters 14 and 20 must have cutoff frequencies no higher than one-half the maximum clock rate. On the other hand the filters must pass the highest frequency in the recorded output of the playback device 10. Thus, the minimum clock rate must be at least twice the maximum recorded frequency and thus becomes the limiting factor as to the maximum delay available with a given shift register delay device 16. For audio playback purposes, for example, a minimum clock rate of 40,000 Hz adequately supports sampling of a 20,000 Hz maximum frequency.

Figure 2:
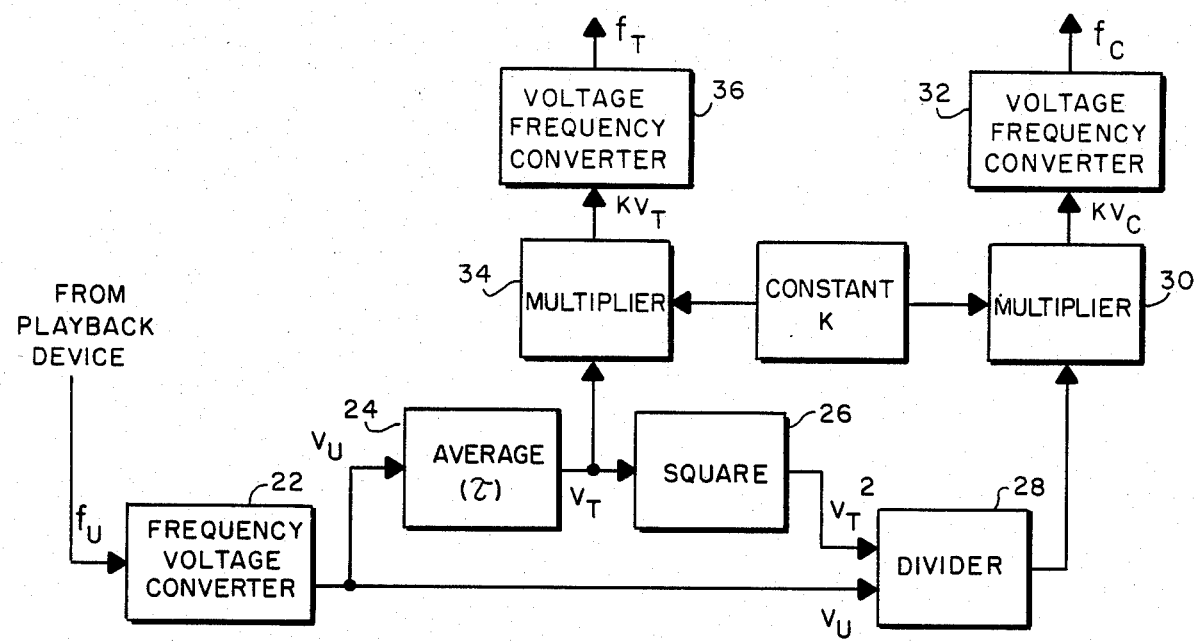
FIG. 2 is a more detailed block diagram of the frequency correction computer of FIG. 1.

FIG. 2 illustrates in block diagram from the frequency correction computer of FIG. 1. The constant known frequency as reproduced by the playback device is coupled to a first frequency to voltage converter 22 the output of which is a voltage, $V_U$, representing the uncorrected frequency signal. This voltage is applied to an averaging circuit 24 and averaged over a period of time, $\tau$, equal to the storage time available in the shift register delay device 16 of FIG. 1. In the practice of the invention it is desirable that the value of $\tau$ be maximized since the accuracy of the correction of frequencies as reproduced by the playback device is proportional to the averaging time i.e., the maximum frequency excursion from $f_T$ is $\pm 1/\tau$. The positive and negative frequency excursions due to wow and flutter average to a constant value, $f_T$, represented by voltage level $V_T$, with the average taken over time period $\tau$. Deviations of $f_T$ from the constant frequency as originally recorded, $f_K$ cannot be corrected by a variable electronic delay as illustrated to the extent the deviation is constant (i.e. for which f does not change by more than $1/\tau$ in a time $\tau$, equivalently $df/dt < 1/\tau^2$). However, such slow variations are readily corrected with a conventional servo system, acting on the playback drive motor and designed to tend to null $f_T - f_K$; a well known procedure in the prior art. Such a design is readily kept stable with a servo bandwidth not exceeding the order of $1/\tau$. The illustrated circuit for the variable delay and for its control in no way interferes with such a servo system, but supplements it by removing the more rapid frequency excursions about $f_T$ known as wow and flutter that may result from either recording or playback motor speed variation, mechanical eccentricity effects, or residual servo instabilities that produce rapid frequency variations. Where preservation of absolute pitch is not essential on playback (frequently the case except in costly equipment) the servo may be completely omitted. The resulting playback is without wow or flutter, but may be shifted in pitch (which is not disturbing except in exacting musical situations).

The output of the averaging circuit 24 is coupled to a squaring circuit 26 the output, $V_T^2$ of which is coupled to a divider 28 to which is also coupled the voltage, $V_U$, representing the uncorrected signal as reproduced by the playback device. The output of the divider 28 is a voltage, $V_C$, equal to $V_T^2/V_U$ and is applied to a first multiplier 30 which it is multiplied by a constant, K, chosen to assure that the minimum correcting clock rate will exceed twice the maximum frequency to be reproduced by the playback device. The output of multiplier 30 is thus a voltage representing the frequency at which the clock drive oscillator 18 of FIG. 1 is to be modulated to effect correction of distortion in the program material as reproduced by the playback device. This voltage is coupled to a first voltage to frequency converter 32 the output, $f_C$, of which is used to modulate the clock drive oscillator of the delay device.

The output of the averaging circuit 24 is also coupled to a second multiplier 34 and multiplied by the same constant, K, and then to a second voltage to frequency converter 36 the output, $f_T$, of which is applied to the delay device of FIG. 1.

Figure 3:
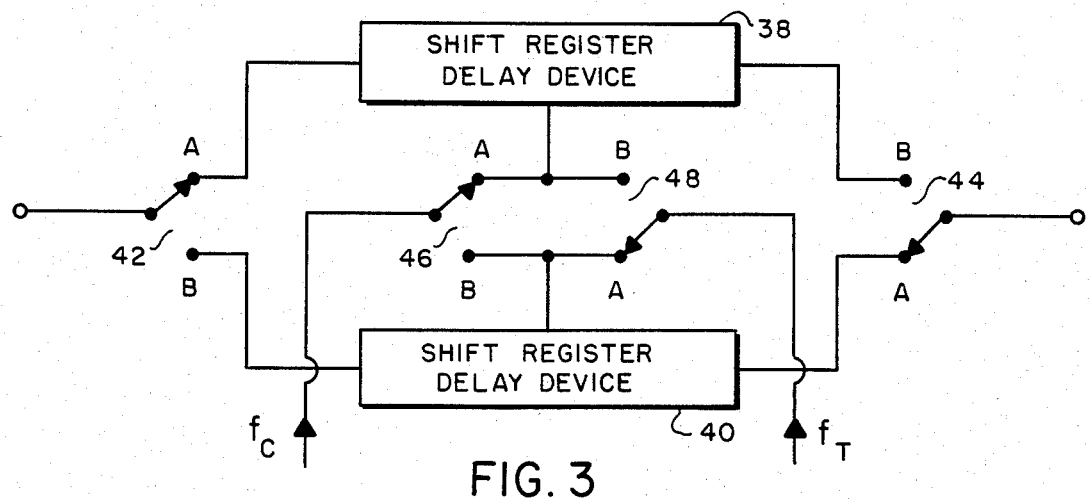
FIG. 3 is a schematic diagram of an analog shift register delay device useful in the system of FIG. 1.

The delay device 16 of FIG. 1 used to accomplish correction of distortion in the output of the playback device may be analog or digital in nature. FIG. 3 illustrates an analog arrangement using a pair of shift register delay devices 38 and 40 such as a Radio-Shack model 276-1761 charge transfer delay which is known in the application to stereophonic reverberation systems. Alternatively a model SAD-4096 serial analog delay which is commercially available from Reticon Corp. of Sunnyvale, Calif., may be used.

The filtered input signal from the playback device is applied to a first switch 42 and the corrected output signal is coupled from the delay device via second switch 44. The clock drive signals $f_C$ and $f_T$ are applied alternately to the respective delay devices 38 and 40 for a time, $\tau$, through switches 46 and 48. Each delay device 38 and 40 provides a delay time of $\tau$ at the target frequency clock rate $f_T$ and all switches synchronously alternate between positions A and B. The use of alternating constant and variable clock drives achieves the variable delays required to compensate for the frequency distortions introduced in the reproduced program material due to wow and flutter. Single pole, double throw Switches 42-48 are shown for purposes of illustration and in actual practice switching would be performed by solid state devices commonly known.

For a general description of the mathematical properties of such a device, we may define as phase I all time periods in which the switches are set so that $f_C$ goes to position A (driving device 38) and phase II any time period in which $f_T$ goes to position B (driving device 38). Thus, for device 38, if $\Delta t'_i$ is the time spacing between successive samples for the $i^{th}$ sample since the start of phase I at the input; $\Delta t''_i$ is the time spacing for the $i^{th}$ sample since the start of phase II at the output; $f_{Ii} = f_{Ci}$ is the acting clock drive rate during phase I (input) for the $i^{th}$ time interval of input during phase I, equated to the value of $f_C$ during the $i^{th}$ time interval in FIG. 3; $f_{IIi} = f_{Ti}$ is the acting clock rate during phase II (output) for the $i^{th}$ time interval of output during phase II, equated to $f_T$, a constant in the illustrated example of FIG. 3. Then the relation between these quantities is:

$$\Delta t''_i = (f_{Ti}/f_{IIi})\Delta t'_i = (f_{Ci}/f_T)\Delta t'_i$$

For device 40, the same relationship holds except that the definitions of phase I and phase II are interchanged, so that the output of device 40 is active when the input of device 38 is active and vice versa. The functioning of the two devices is thus complementary in time. Note that the switches 42 and 44 may be thrown every $\tau$ seconds, or for any time interval shorter than that, down to the time between successive signal samples in the extreme.

An additional application of the apparatus of FIGS. 1-3 relates to the speeded up playback of voice recordings. Based upon the premise that the mind operates much faster than typical human speech a listener to a voice recording will have increased comprehension and retention of the recorded material if it is played back at a higher speed than used in recording; e.g. twice the recording speed. Simple higher speed playback, however, increases the pitch undesirably.

If, in addition to this increased playback speed, the switching rate between A and B were speeded up to faster than every $\tau$ seconds, in particular with switching taking place on each alternate input signal sample, and the output taken from device 38 only, i.e. from B at switch 44, rather than from the switched conductor in FIG. 3 for which the output is presently illustrated, then playback will be at substantially double the speed, but with no increase in pitch because the sampling rate at the output will be half that at the input. While "decimation" of the sampling rate is well known in the art of digital filtering, as are the need and proper placement of appropriate low pass filters to avoid aliasing distortion, the present method additionally removes the wow and flutter effects that may be especially irritating to the listener under such speeded up playback conditions.

The concept may be expanded to a plurality of pairs of shift register delay devices with appropriate input and output switching. If $N_P$ pairs of delay devices were to be used the storage time of each device would be $2\tau/N_P$ and the switching rate from pair to pair would be $\tau/N_P$. The signal in and $f_C$ clock drive switches advance together as do the signal out and $f_T$ clock drive switches however the latter would lag the former by one position.

Figure 4:
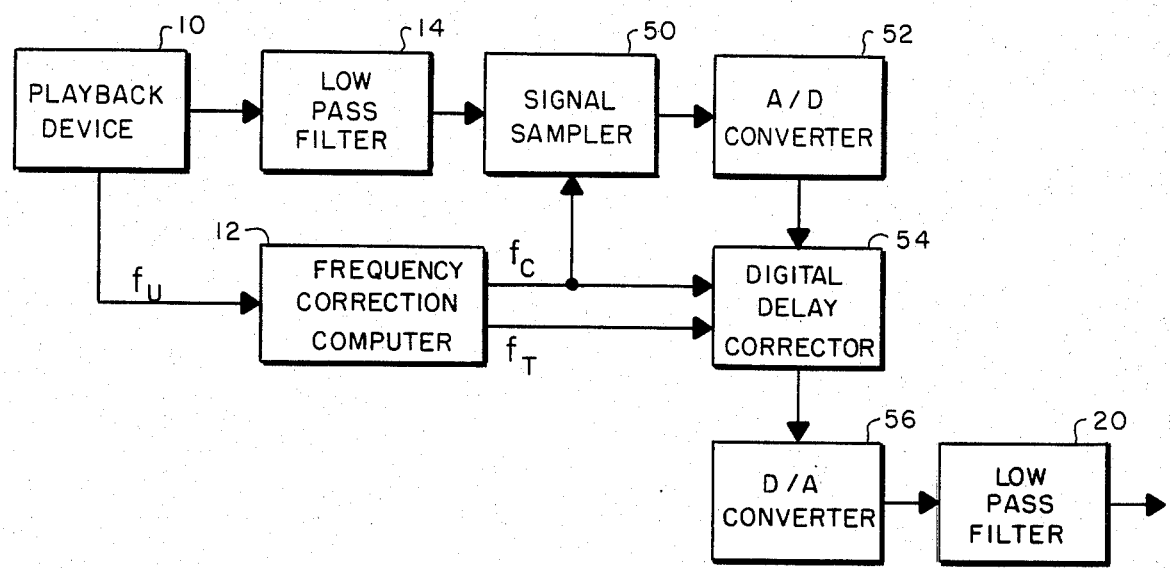
FIG. 4 is a block diagram of a digital embodiment of the present invention.

With reference to FIG. 4 there is shown a digital embodiment of the present invention wherein elements common to those of FIG. 1 are identified by like reference characters. In this embodiment the program signal from the playback device 10 passed by the low pass filter 14 is applied to a signal sampler 50 where it is sampled at the correction frequency, $f_C$, rate as determined by the frequency correction computer 12. The sampled signal is coupled to an analog-to-digital converter 52 and then to a digital delay device 54 such as a bubble memory shift register or random access memory which provides the variable electronic delay required to execute the principals of the invention. The corrected digital signal is converted back to analog form in digital-to-analog converter 56 and coupled to low pass filter 20 the output of which is the program output of the playback device corrected to substantially eliminate the effects of wow and flutter.

Figure 5:
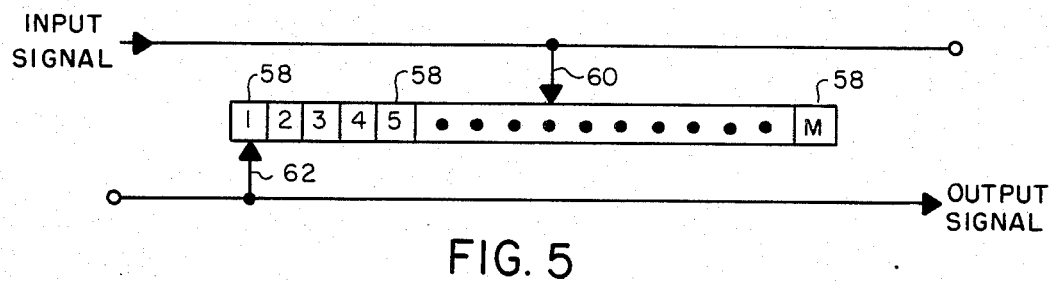
FIG. 5 is a schematic representation of a digital delay corrector useful in the system of FIG. 4.

FIG. 5 is a simplified schematic representation of a digital delay corrector with independently addressable read and write capability. It is a digital memory with an even number, M, of storage locations 58 equal to two times the target frequency, $f_T$, times the storage time $\tau$. The instantaneous write address 60 is incremented at the correction frequency, $f_C$, sequentially from location 1 through M. The instantaneous read address 62 is started at M/2 locations behind the write address and is incremented at the target frequency, $f_T$. In modern practical applications, of course, the write and read functions would be via a common data bus as opposed to the separate read and write lines shown.

From the foregoing it will be understood that the applicants have provided a new and improved apparatus for controlling the effects of wow and flutter in reproduced signals whereby the objectives set forth hereinabove are efficiently achieved. Since certain changes in the above described construction will occur to those skilled in the art without departure from the scope of the invention, it is intended that all matter set forth in the preceding description or shown in the appended drawings shall be interpreted as illustrative and not in a limiting sense.

Having described what is new and novel and desired to secure by Letters Patent, what is claimed is:

1. Apparatus for correcting instantaneous frequency deviation in the output signal of a playback device, said apparatus comprising means for providing a constant frequency signal at the output of said playback device in addition to the normal recorded program material to be reproduced by said playback device;

a frequency to voltage converter having an input coupled to said playback device, adapted to receive said constant frequency signal as reproduced by said playback device, and operating to produce an output voltage proportional to the frequency of the input signal;

a voltage averaging means having an input coupled to the output of said frequency to voltage converter and operating to average the input signal over a predetermined time period and produce an output signal representing said constant frequency signal as originally provided;

means coupled to the output of said frequency to voltage converter and to the output of said voltage averaging means for comparing the outputs thereof and producing an output voltage proportional to the frequency of a control signal required to correct said instantaneous frequency deviations in the output of said playback device;

a first voltage to frequency converter coupled to the output of said comparing means and operating to produce a first control signal;

a delay device coupled to the output of said playback device and adapted to receive signals representing the normal recorded program material as reproduced by said playback device, said delay device having a clock drive adapted to be driven by a control signal of variable frequency and coupled to the output of said first voltage to frequency converter;

whereby the signals representing the normal recorded program material as reproduced by said playback device are selectively delayed by a time proportional to the frequency of said first control signal to thereby substantially correct said instantaneous frequency deviations in the output of said playback device.

2. Apparatus as recited in claim 1 further including a low pass filter coupled between said playback device and said delay device and having a cut-off frequency less than one half of the maximum frequency of said control signal.

3. Apparatus as recited in claim 1 wherein said delay device is an analog shift register delay device.

4. Apparatus as recited in claim 3 wherein said analog shift register delay device is a charge transfer delay line.

5. Apparatus as recited in claim 1 further including a second voltage to frequency converter coupled to the output of said voltage averaging means for producing a second control signal of a frequency substantially equal to said constant frequency signal as originally provided; and wherein said delay device comprises first and second shift register delay devices, first, second, third and fourth single pole double throw switching devices, said first switch having its pole coupled to the output of said playback device, one contact coupled to the input of said first delay device and the other contact coupled to the input of said second delay device, said second switch having one contact coupled to the output of said first delay device, the other contact coupled to the output of said second delay device, and its pole forming the output of said delay device, the poles of said first and second switches being disposed such that when the pole of said first switch is coupled to one of said delay devices the pole of said second switch is coupled to the output of the other of said delay devices, said third switch having its pole coupled to the output of said first voltage-to-frequency converter, one contact coupled to the clock drive input of said first delay device and the other contact coupled to the clock drive input of said second delay device, said fourth switch having its pole coupled to the output of said second voltage-to-frequency converter, one contact coupled to the clock drive input of said first device and the other contact coupled to the clock drive input of said second delay device, the poles of said third and fourth switches being disposed such that the pole of said third switch is coupled to the same delay device as is the pole of said first switch and the pole of said fourth switch is coupled to the same delay device as is the pole of said second switch, and means for synchronously operating said first, second, third and fourth switches to alternate between the contacts thereof.

6. Apparatus as recited in claim 1 further including means coupled between the output of said comparing means and said first voltage to frequency converter for multiplying the output of the comparing means such that the minimum frequency of said first control signal is in excess of twice the maximum frequency reproduced by said payback device.

7. Apparatus as recited in claim 5 further including means coupled between the output of said voltage averaging means and said second voltage to frequency converter for multiplying the output of said voltage averaging means such that the minimum frequency of said second control signal is in excess of twice the maximum frequency reproduced by said playback device.

8. Apparatus as recited in claim 1 wherein the output of said playback device is sampled at a rate equal to the frequency of said control signal, and further including an analog to digital converter coupled to the output of said sampling means, a digital delay corrector coupled to the output of said analog to digital converter and adapted to receive said first and second control signals, and a digital to analog converter coupled to the output of said digital delay corrector.

9. Apparatus as recited in claim 8 wherein said digital delay corrector is a random access memory having independently addressable read and write functions.

* * * * *